H. R. DECKER.
WELL SCREEN.
APPLICATION FILED JUNE 7, 1909.

979,748.

Patented Dec. 27, 1910.

WITNESSES:

INVENTOR
Harry R. Decker
BY
Edward V. Hardway
ATTORNEY

UNITED STATES PATENT OFFICE.

HARRY R. DECKER, OF HOUSTON, TEXAS.

WELL-SCREEN.

979,748.     Specification of Letters Patent.     Patented Dec. 27, 1910.

Application filed June 7, 1909. Serial No. 500,482.

*To all whom it may concern:*

Be it known that I, HARRY R. DECKER, a citizen of the United States, residing at Houston, in the county of Harris and State of Texas, have invented certain new and useful Improvements in Well-Screens, of which the following is a specification.

My invention relates to new and useful improvements in well screens.

The object of the invention is to provide a screen of the character described that will be of sufficient strength to admit of hard rotation without disarrangement of the strainer wire and spacers, and one which will have a comparatively large screen surface.

Another feature resides in the arrangement of the parts whereby a simple and easy construction of the screen is made possible, and a simple, inexpensive and durable screen thus produced.

With the above and other objects in view my invention has particular relation to certain novel features of construction, and arrangement of parts, an example of which is given in this specification and illustrated in the accompanying drawings, wherein:—

Figure 1:
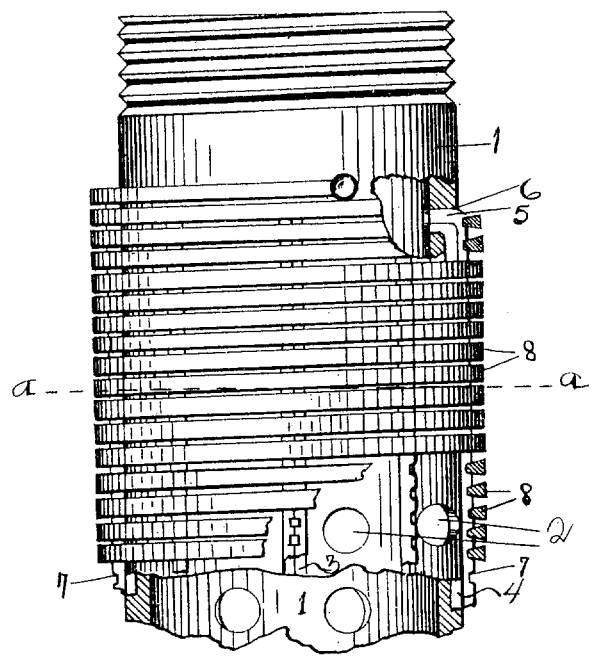
Figure 2:
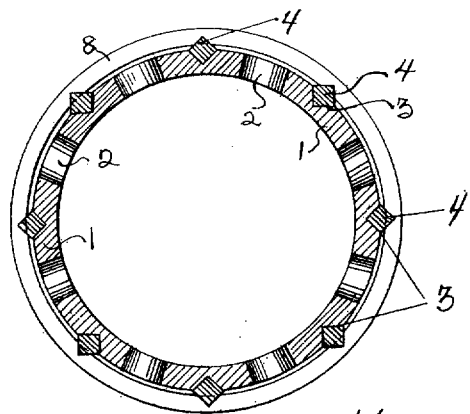

Figure 1 is a side elevation of a portion of the strainer, a portion of the strainer wire being omitted to show the perforated pipe beneath, a section of which is removed to show the method of attachment of the spacers thereto. Fig. 2 is a transverse section on the line *a—a* of Fig. 1, showing, in detail, the spacers, which are partially buried in the strainer pipe, and are provided for the purpose of supporting the strainer wires.

Referring now more particularly to the drawings, wherein like numerals of reference designate similar parts in each of the figures, the numeral 1 refers to the strainer pipe which is provided with a plurality of perforations 2, through which the fluid can pass to the interior of the pipe.

In practice, the pipe is driven, or rotated, down into the well and the fluid flows or percolates in through the perforations 2 from the surrounding earth or fluid reservoir.

In order to prevent the inflowing fluid from carrying in dirt, sand, gravel etc. it is necessary to provide a suitable filtering or straining device which will arrest the movement of the sand and other foreign matter, before it enters the pipe and will not interfere, to any serious extent, with the passage of fluids, such as oil, water or gas.

For the purpose of making provision for the support of said straining device I have run V-shaped grooves 3 longitudinally, along the periphery of the pipe 1. A number of these grooves are necessary, as will become apparent, hereinafter, but the number of the grooves and their distance apart will vary in accordance with the size of the strainer pipe, and the conditions met in the various wells in which it is to be used.

Spacers 4, whose cross section, may be triangular, square, diamond shaped or of some other desirable contour, are partially buried in said grooves, and spacers should be provided whose under portion will conform exactly to the grooves into which they are designed to fit. The outer portion of the spacer is designed to project beyond the outer surface of the strainer pipe, and while this portion may be of any shape, it should, preferably taper to a thin edge so as to interfere, as little as possible, with the passage of the liquid into the pipe.

The extremities of each spacer is provided with an inwardly projecting lug or arm 5, designed to pass through an opening 6 in the strainer pipe and to be bent down or soldered therein. The spacers, thus partially buried in the grooves 3 and having ends secured to the pipe 1 as shown and described, cannot be wrenched from their proper position by the rotation of the screen in lowering the same into the well, thus providing a screen which overcomes the prime defect of those now in common use, and provides spacers capable of being notched to any desired depth to support the strainer a proper distance from the pipe surface.

The outer, or sharp edge of the spacers 4 is provided with notches 7 and the notches of the successive spacers are so disposed, relative to each other, as to form a spiral groove which is engaged by the strainer 8 presently described.

The strainer 8, to which reference has just been made, is constructed from a length of wire which is seated in the notches 7 and the whirls of which are a suitable distance apart and so disposed, as while permitting free passage of liquid to the perforations 2 of pipe 1, excludes the passage of sand, gravel, etc.

As shown in Fig. 1, the wire of which the strainer is made is triangular in cross section, and this is the preferred shape; but if desired the wire may be circular, semi-cylindrical, or diamond shaped, in cross section.

The extremities of the strainer wire are secured, in any preferred manner, to the pipe, as by soldering thereto.

A screen, constructed as described and shown, will be found to be very strong and durable, so as to allow hard rotation, without disarrangement of the spacers or the strainer wires; as well as simple and comparatively inexpensive to construct, and easily repaired in case of injury to any of its parts.

What I claim is:—

1. In a well screen a perforated strainer pipe provided with a plurality of longitudinal grooves therein, spacers designed to be partially embedded in said grooves for their entire length, the outer portions of which project from said grooves, and are provided with notches, said notches forming a spiraled groove, and a strainer held in position by the spiraled groove.

2. In a well screen a perforated strainer pipe provided with a plurality of longitudinal grooves therein, spaces designed to be partially embedded in said grooves for their entire length, the outer portions of which project from said grooves and are provided with sharp edges, and a strainer held in position by the spacers.

3. In a well screen, a perforated strainer pipe provided with a plurality of longitudinal grooves therein, spacers designed to be partially embedded in said grooves for their entire length, the outer portions of which project from said grooves, and a strainer held in position by the spacers.

In testimony whereof I have signed my name to this specification in the presence of two subscribing witnesses.

HARRY R. DECKER.

In the presence of—
Wm. A. Cathey,
C. Dodson.